United States Patent [19]
Quick

[11] 3,894,621
[45] July 15, 1975

[54] SPLINED THRUST WASHER

[75] Inventor: David C. Quick, New Berlin, Wis.

[73] Assignee: Allis-Chalmers Corporation, Milwaukee, Wis.

[22] Filed: Dec. 26, 1973

[21] Appl. No.: 428,245

[52] U.S. Cl. .......... 192/109 R; 192/110 R; 403/359
[51] Int. Cl. ............................................. F16d 11/00
[58] Field of Search ..... 192/109 R, 110 R; 403/359, 403/317

[56] References Cited
UNITED STATES PATENTS

| | | | |
|---|---|---|---|
| 2,108,679 | 2/1938 | Kurti | 403/359 X |
| 2,397,905 | 4/1946 | Acton et al. | 192/109 R X |
| 2,886,358 | 5/1959 | Munchbach | 403/359 |
| 3,270,843 | 9/1966 | Ivanchich | 192/53 F |
| 3,414,098 | 12/1968 | Kelbel | 192/53 F |

*Primary Examiner*—Benjamin W. Wyche
*Attorney, Agent, or Firm*—Arthur L. Nelson

[57] ABSTRACT

A splined thrust washer for transmitting gear thrust from a gearset to the shaft carrying reaction thrust to avoid excessive bearing loads in a power transmission.

10 Claims, 3 Drawing Figures

SPLINED THRUST WASHER

This invention relates to a power transmission and more particularly to a thrust washer on a drive shaft for transmitting axial thrust from a drive gearset to a drive shaft to counteract reaction thrust from a pinion driving the differential.

Power transmissions including gears and shafts are usually provided with bearings for supporting the shafts to withstand a certain amount of axial thrust loading. These bearings are often tapered roller bearing which will accommodate both radial and axial loading simultaneously. Countershaft transmissions using helical gears for driving from the drive shaft to the countershaft and back to the driven shaft of the transmission operate quieter than spur gears. The helical gears, however, create an axial thrust normally carried by the bearings supporting the shaft. In larger power transmissions axial thrust may become excessive and some provision to alleviate the thrust loading is desirable. Accordingly, if the thrust load from the helical driving gearset is transmitted to the propeller shaft the reaction force from the pinion driving ring gear of the differential will counteract this force and provide a means of reducing the thrust loading on the bearing and adjacent rotating gears.

Accordingly, this invention provides a thrust washer positioned on the propeller shaft where it bears against a lateral surface of an annular recess and transmits the axial thrust loading from the helical gearset to the shaft. The axial loading is counteracted by the tapered helical pinion of the propeller shaft driving the ring gear of the differential. This relieves the bearing load normally inherent with the helical type drive gear which is normally absorbed by the tapered roller bearings.

It is an object of this invention to provide a thrust washer on a drive shaft to carry the axial thrust load through the drive shaft to reduce the bearing loading of the drive shaft, reduce reverse thrust of gears during coasting, and reduce thrust between gears on a common shaft rotating at different speeds to reduce friction.

It is another object of this invention to provide a thrust washer on a drive shaft to carry the axial thrust loading caused by a helical drive gearset which is counteracted by the reaction thrust of the tapered drive pinion driving the differential.

It is a further object of this invention to provide a reaction thrust washer which is splined to permit assembly on a splined shaft and positioning of the washer in an annular groove in the drive shaft for alignment within the clutch collar to prevent its rotation and for transmission of the axial thrust loading of the splined shaft from the helical drive gearset.

The objects of this invention are accomplished by providing a propeller shaft which is axially splined on its external surface to receive the the mating splined clutch collar. A clutch sleeve is slidably positioned on the internally and externally splined clutch collar to selectively engage one of the plurality of gears for rotation with the drive shaft. A countershaft is also positioned axially parallel with the propeller shaft and carries gears engaging the gears on the propeller shaft which are helical type gears creating a thrust loading. The thrust loading is transmitted not to the bearing rotatably supporting the propeller shaft nor adjacent gears but through the thrust washer to the propeller shaft per se. The axial thrust loading in the propeller shaft is counteracted by a tapered pinion gear which drives a ring gear of the differential and produces a counterforce in the propeller shaft which reacts with an initial thrust loading caused by the helical gearset. Accordingly, the counteracting of these two forces reduces or substantially eliminates any thrust loading inherent on the tapered roller bearings carrying the propeller shaft or on adjacent gears. This permits adjacent gears running on the same shaft to run freely by eliminating friction between the gear and provides a freely running shaft in the bearing assemblies to increase bearing life.

The preferred embodiments of this invention are illustrated in the attached drawings.

Figure 1:
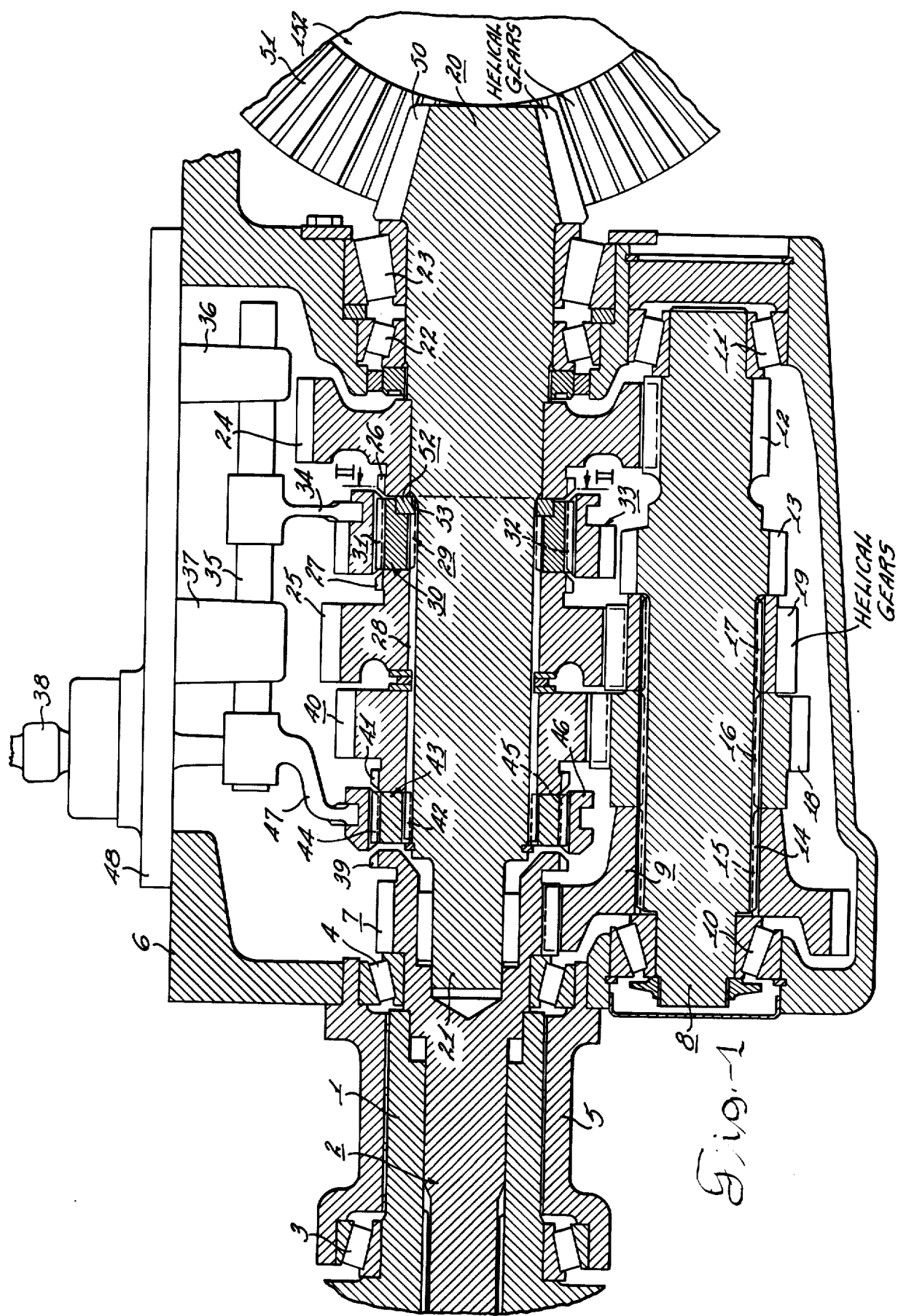
FIG. 1 illustrates a cross section view of the countershaft transmission driving the ring gear of a differential.
Figures 2, 3:
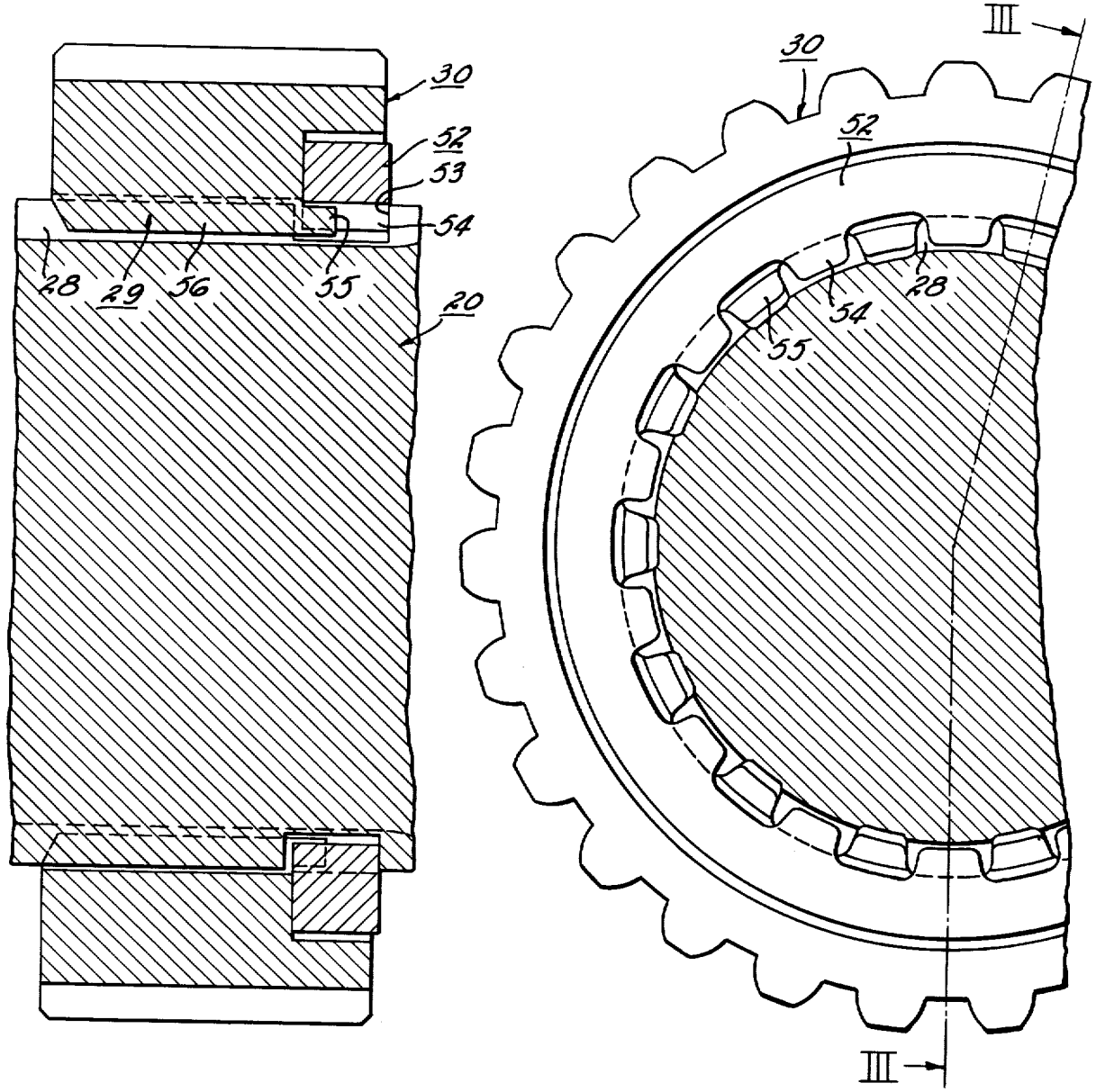
FIG. 2 is a cross section view of the thrust washer on the propeller shaft received in an annular recess of the clutch collar taken along line II—II of FIG. 1.
FIG. 3 is a cross section view taken along line III—III of FIG. 2.

Referring to the drawings, the preferred embodiment of this invention is illustrated. FIG. 1 illustrates a cross section view of the countershaft transmission. The quill shaft 1 carries the drive shaft 2 which is rotatably mounted in the bearing assemblies 3 and 4. The bearing assemblies 3 and 4 are mounted in a casing 5 which is connected to the transmission housing 6. The drive gear 7 is integral with the drive shaft 2 which drives a countershaft 8 through the countershaft gear 9. The countershaft 8 is rotatably mounted in the bearing assemblies 10 and 11 which in turn are carried in the transmission housing 6. The countershaft gears 12 and 13 are integral with the countershaft 8. The countershaft 8 is formed with an external spline 14 which engages the mating splines 15, 16 and 17 of the countershaft gears 9, 18 and 19.

The propeller shaft 20 is formed with the stub end 21 which is received within the end of drive shaft 2 and is rotatably supported through the bearing 4. The rear end of the propeller shaft 20 is rotatably supported in the bearing assemblies 22 and 23 which are embraced by the transmission housing 6.

The propeller shaft 20 rotatably supports the driven gears 24 and 25. The gear 24 has clutch teeth 26 while the gear 25 has clutch teeth 27.

Propeller shaft 20 is formed with the external spline 28. The external spline 28 engages the internal spline 29 of the clutch collar 30. The clutch collar 30 is provided with external spline 31 which engages the internal spline 32 of the clutch sleeve 33. The internal spline 32 on clutch sleeve 33 is slidably moved by the shift fork 34 to selectively engage the clutch collar 30 with the clutch teeth 26 of gear 24 or the clutch teeth 27 of gear 25. The shift rail 35 is slidably moved in the rail supports 36 and 37 by the shift lever 38.

Similarly, gear 7 is formed with clutch teeth 39 while the gear 40 is formed with clutch teeth 41. Gear 40 is rotatably supported on the propeller shaft 20. The external spline 28 of the propeller shaft 20 engages the spline 42 of the clutch collar 43. The external spline 44 of the clutch collar 43 slidably engages the internal spline 45 of the clutch sleeve 46. The shift fork 47 is operated by the shift lever 38 to selectively engage the clutch sleeve 46 with the clutch teeth 41 of gear 40 or the clutch teeth 39 of gear 7.

The shift lever is supported on the cover plate 48 on the transmission housing 6.

The propeller shaft 20 is integral with the spiral bevel pinion gear 50 which drives the spiral ring gear 51 on the differential 52. The gears on the propeller shaft 20 are helical gears which produce an axial thrust in the right-hand direction when the transmission is in operation. It can also be seen that the spiral bevel pinion gear 50 produces an axial thrust in the left-hand direction. To avoid transmitting these forces through the bearings supporting the propeller shaft, a thrust washer 52 is positioned within the annular groove 53 of the propeller shaft 20. The thrust washer 52 is formed with a spline 54 which has aligned teeth which are aligned with the spline teeth 28 of the propeller shaft 20. This alignment is maintained by the teeth ends 55 which are extensions of the spline teeth 56 of spline 29. The thrust washer 52 can be easily assembled in the groove 53 by sliding the spline 54 of the washer 52 on the spline 28 of the propeller shaft 20. When the washer 52 reaches the annular groove 53, it is rotated so the teeth of the washer 52 are axially aligned with the teeth of the spline 28 on the propeller shaft 20. The collar 30 is then positioned on the propeller shaft 20 and slid axially until the teeth ends 55 are in alignment in the grooves of the washer 52. This maintains the alignment of the washer on the propeller shaft.

The operation of this device will be described in the following paragraph.

The transmission as shown is a countershaft transmission. The drive shaft 2 drives through the countershaft 8 and back to the propeller shaft 20. In a direct drive, the clutch sleeve 46, however, connects the drive gear 7 directly to the countershaft 20. The drive of the transmission through the countershaft 8 drives through one of a selected number of gearsets between the countershaft 8 and the propeller shaft 20. When the gearset including gear 19 on the countershaft 8 is driving through the gear 25 on the propeller shaft 20, there is a thrust load produced by the helical gears 19 and 25. This thrust loading is in the right-hand direction and transmitted through the clutch collar 30. The thrust is then transmitted to the thrust washer 52 which is received within the annular groove 53 in the propeller shaft 20. The thrust load is transmitted to the wall of the annular groove 53 and then into the propeller shaft 20. Any thrust load which would normally be transmitted to the tapered roller bearing assembly 22 is counteracted by the thrust of the spiral bevel pinion gearing 50 engaging the spiral bevel ring gear 51 of the differential 152. The axial thrust forces counteract each other within the shaft 20 and this minimizes axial loads on the tapered roller bearings 22. Accordingly, with reduced bearing loads the bearing life is substantially increased.

A reverse thrust loading is produced through gear 24 which is transmitted through the thrust washer 52 when the transmission is coasting. This thrust force and the force from the differential gears are absorbed in shaft 20.

The embodiments of the invention in which an exclusive property or privelege is claimed are defined as follows:

1. A power transmission having a gear producing an axial thrust responsive to gear drive comprising, a drive shaft having an external spline and defining an annular groove, a gear on said shaft producing an axial thrust, a thrust washer defining axial grooves, a clutch collar defining an annular recess and having a spline received in the spline of said shaft, said clutch collar defining teeth for positioning in the grooves of said washer to align said washer on said shaft, means connecting said gear to said shaft, said thrust washer received in the annular recess of said collar to thereby transmit the axial thrust from said gear to said shaft.

2. A power transmission having a gear producing an axial thrust responsive to gear drive as set forth in claim 1 including a driven gear on said shaft producing an axial counterthrust counteracting said thrust in said transmission.

3. A power transmission having a gear producing an axial thrust responsive to gear drive as set forth in claim 1 including a spline on said thrust washer forming teeth and the axial grooves permitting said thrust washer to be axially assembled on said spline of said drive shaft, said teeth extending from the spline of said collar extending into the recess of said collar for retaining alignment of the teeth on said washer with the spline teeth of said shaft as the collar teeth extend into the grooves of said thrust washer.

4. A power transmission having a gear producing an axial thrust responsive to gear drive as set forth in claim 1 wherein said thrust washer defines internal spline teeth, said collar defines extension of spline teeth extending into the grooves between the spline teeth on said washer to align internal teeth of said washer with the external spline on said shaft.

5. A power transmission having a gear producing an axial thrust responsive to gear drive as set forth in claim 1 wherein said clutch collar defines an external spline, said gear defines clutch teeth, a clutch sleeve defining an internal spline for slidably engaging the external spline of said clutch collar for selectively connecting the shaft with said drive gear.

6. A power transmission having a gear producing an axial thrust responsive to gear drive as set forth in claim 1 wherein said drive shaft includes a vehicle propeller shaft.

7. A power transmission having a gear producing an axial thrust responsive to gear drive as set forth in claim 1 wherein said drive shaft defines said annular groove at the end of the splined portion of said drive shaft, said washer defines a splined internal periphery, said clutch collar defines said teeth extending into said recess of said collar for positioning the spline teeth of said washer in axial alignment with the spline teeth of said drive shaft.

8. A power transmission having a gear producing an axial thrust responsive to gear drive as set forth in claim 1 wherein said collar defines said annular recess at the end of said collar on its internal periphery.

9. A power transmission having a gear producing an axial thrust responsive to gear drive as set forth in claim 1 wherein said washer defines spline teeth and the axial grooves, said collar teeth are received in said annular groove of said drive shaft and said annular recess of said clutch collar.

10. A power transmission having a gear producing an axial thrust responsive to gear drive as set forth in claim 1 wherein said means connecting said gear to said shaft includes a clutch sleeve for selectively connecting said gear to said drive shaft.

* * * * *